United States Patent
Hagedorn

(10) Patent No.: US 8,457,934 B2
(45) Date of Patent: Jun. 4, 2013

(54) METHOD FOR INSTALLING A RADIAL GEOTHERMAL ENERGY PROBE FIELD

(75) Inventor: Andreas Hagedorn, Olpe (DE)

(73) Assignee: Tracto-Technik GmbH & Co. KG, Lennestadt (DE)

( * ) Notice: Subject to any disclaimer, the term of this patent is extended or adjusted under 35 U.S.C. 154(b) by 90 days.

(21) Appl. No.: 13/034,106

(22) Filed: Feb. 24, 2011

(65) Prior Publication Data

US 2012/0059632 A1 Mar. 8, 2012

(30) Foreign Application Priority Data

Feb. 24, 2010 (DE) .......................... 10 2010 009 171
May 25, 2010 (DE) .......................... 10 2010 021 475

(51) Int. Cl.
*G06F 7/60* (2006.01)
*G06G 7/56* (2006.01)
*G06G 7/48* (2006.01)

(52) U.S. Cl.
USPC ..................................... 703/2; 703/5; 703/10

(58) Field of Classification Search
USPC .................................................... 703/2, 5, 10
See application file for complete search history.

(56) References Cited

U.S. PATENT DOCUMENTS

| | | | |
|---|---|---|---|
| 8,161,759 B2 * | 4/2012 | Kidwell et al. | 62/115 |
| 8,230,900 B2 * | 7/2012 | Stojanowski | 165/45 |
| 2009/0084518 A1 | 4/2009 | Panula et al. | |
| 2010/0059198 A1 * | 3/2010 | Amann et al. | 165/45 |
| 2011/0206085 A1 * | 8/2011 | Hagedorn | 374/136 |

FOREIGN PATENT DOCUMENTS

| | | |
|---|---|---|
| DE | 30 09 572 | 9/1981 |
| DE | 31 29 219 | 2/1983 |
| DE | 196 40 093 | 4/1998 |
| GB | 2 045 909 | 11/1980 |
| GB | 2 450 754 | 1/2009 |
| WO | WO82/02935 | 9/1982 |
| WO | WO 2008/034970 | 3/2008 |

OTHER PUBLICATIONS

Arthur Huber et al.: "Erweiterung des Programms EWS für Erdwärmesondenfelder", in: Forschungsprogramm Umgebungs- und Abwärme, Wärme-Kraft-Kopplung (UAW), Dec. 1999.

* cited by examiner

*Primary Examiner* — Omar Fernandez Rivas
*Assistant Examiner* — Nithya J Moll
(74) *Attorney, Agent, or Firm* — Henry M. Feiereisen LLC

(57) ABSTRACT

A method for installing a radial geothermal probe field includes the steps of defining a total number of geothermal energy probes to be introduced, defining the directions of incidence of the individual geothermal energy probes, determining perforation points of the geothermal energy probes in a spherical projection, determining the included angles between nearby geothermal energy probes, determining a mean value of the included angles, determining a mean value of the geothermal energy probe lengths, determining a mean center spacing using the mean values for the included angles and the length of the geothermal energy probes, calculating the total heat removal capacity by using conventional computing methods for vertical geothermal energy probe fields and the mean center spacing for the distance between probes, and COMPARING the computed total heat removal capacity with a predetermined desired heat removal capacity.

5 Claims, 2 Drawing Sheets

METHOD FOR INSTALLING A RADIAL GEOTHERMAL ENERGY PROBE FIELD

CROSS-REFERENCES TO RELATED APPLICATIONS

This application claims the priority of German Patent Applications, Serial No. 10 2010 009 171.5, filed Feb. 24, 2010, and Serial No. 10 2010 021 475.2, filed May 25, 2010 and pursuant to 35 U.S.C. 119(a)-(d), the content of which is incorporated herein by reference in its entirety as if fully set forth herein.

BACKGROUND OF THE INVENTION

The present invention relates to a method for installing a radial geothermal energy probe field.

The following discussion of related art is provided to assist the reader in understanding the advantages of the invention, and is not to be construed as an admission that this related art is prior art to this invention.

The use of geothermal energy for energy generation has increased significantly over the past years. Geothermal energy is typically generated either by using thermal energy probes or geothermal energy collectors installed in the ground. In the presently most widely used method today for using geothermal energy, a number of vertical bore holes arranged with a defined spacing from one another, in which individual geothermal energy probes are inserted, are installed in a defined area, for example a garden of a single family dwelling. Disadvantageously, with this type of installation, geothermal energy probes can only be installed in areas which are not built-up, because a corresponding drilling rig must be positioned at all locations where a geothermal energy probe is to be inserted. Introduction of a plurality of vertical geothermal energy probes is also relatively expensive, because the drilling rig used to drill the bore hole in the ground and insert the probe into the bore hole must be aligned anew at each of these locations. Transporting the drilling rig from the individual locations may also cause significant damage to the vegetation which has to be repaired later.

These disadvantages have lead to the development of a method where the geothermal energy probes are introduced into the ground radially, i.e., in different directions and with different inclination angles, from a single point, for example an excavated starting shaft. This type of star-shaped installation of geothermal energy probes is generally referred to as "Geothermal Radial Drilling" (GRD). This method has the significant advantage that the drilling rig must only be positioned at a single location from which the rig then introduces the bore holes in the ground with different directions. Due to the inclined arrangement of the thermal energy probes in the ground, these probes can moreover extend into regions of the ground where the surface has been built up.

Geothermal energy probes may not only be used to generate heat, but also to cool the air in buildings during the summer through heat exchange from the geothermal energy probes in the ground, when the temperature of the air and inside the buildings connected to the geothermal energy system is significantly higher than the temperatures in the ground.

One problem that has to be taken into account when designing geothermal energy fields where several geothermal energy probes are installed with a relatively small spacing therebetween is the reduced energy removal efficiency caused by the drift of the cooled (or heated) groundwater due to groundwater flow. Regardless if the groundwater flow in the corresponding region has a stable direction or an instable direction, the individual geothermal energy probes produce (heat or) cold streaks which can flow to other geothermal energy probes in the probe field and thereby significantly weaken the thermal efficiency of these geothermal energy probes exposed to the flow.

To reduce the mutual interaction between the geothermal energy probes, a greater spacing between the individual geothermal energy probes and/or a greater length of the geothermal energy probes are typically selected in a vertical installation than would otherwise be required based on a computation which takes into account the dimensioning parameters (in particular the energy demand and temperature gradients in the ground). Moreover, if the groundwater flow is directionally stable, the location of the individual geothermal energy probes can be selected such that groundwater whose temperature was changed by one of the geothermal energy probes does not flow towards another geothermal energy probe, or only to very few geothermal energy probes in the geothermal energy field. Such arrangement of the locations, however, can in many situations not be reliably determined because, on the one hand, the groundwater flow frequently lacks the required directional stability and, on the other hand, the drift of the groundwater cannot be predicted with sufficient accuracy.

The corresponding measures for reducing the mutual interaction between the geothermal energy probes of a radial geothermal energy probe field may involve increasing the separation angle between the individual geothermal energy probes and/or lengthening the probes.

A design of a geothermal energy system which matches as exactly as possible the demand is of vital importance, because an undersized system makes it impossible to satisfy the energy demand, whereas an oversized system results in unnecessarily high costs. However, a correct design of a geothermal energy probe field is quite complicated because a large number of factors affect the heat removal capacity of the installed geothermal energy probes. In general, in the design of a geothermal energy system initially an energy demand is defined which depends on the intended use (e.g., heating a single-family dwelling). This energy demand is converted into a corresponding total heat removal capacity of the geothermal energy system. The geothermal energy probe field can then be designed based on the determined total heat removal capacity, wherein the important factors are the number of geothermal energy probes, the length of the individual geothermal energy probes and—due to the mutual thermal interaction—the distance between the geothermal energy probes (in vertical geothermal energy probe fields) or the installation directions of the individual geothermal energy probes (in radial geothermal energy probe fields). By changing these factors, the thermal heat removal capacity of the geothermal energy probe field can be altered and adapted, wherein additional factors which can only be slightly affected or not at all, also considerably affect the specific heat removal capacity and must therefore be taken into consideration when designing the geothermal energy probe field.

Because the total heat removal capacity of a geothermal energy probe field depends of a number of different factors, a precise design of a geothermal energy probe field can most likely not be accomplished without computing support.

Geothermal energy probe fields can be simulated with simulation programs based on complex finite-element or finite-difference models and designed with an optimization computation. This approach, however, is time-consuming and requires from the user a deeper understanding on the level of an engineer, which typically exceeds the knowledge base of the drilling company involved in the construction of geothermal energy systems. Specialized engineering providers must then be typically engaged for the design. The associated costs can only be justified when constructing very large geothermal energy systems.

To reduce the cost and complexity associated with simulation of geothermal energy probe fields with simulation software, numerically-based software has been developed which can also be used to design a geothermal energy probe field. The significant advantage of this numerically-based software over simulation software is, on one hand, its low-cost and, on the other hand, its speed where already after several seconds of computing time usable results for designing a geothermal energy probe field can be obtained. Additionally, because the numerically-based software is based on reducing and simplifying the boundary conditions used for the design, only a small number of simple inputs is required from the user, so that application of the software requires only limited skills and can therefore also be performed by the employees of the construction companies.

Disadvantageously, however, numerically-based dimensioning software is until now available only for vertical geothermal energy probe fields. Radial geothermal energy probe fields are therefore frequently still designed by numerical calculations using the values for the specific heat removal capacity listed in the VDI Regulations VDI 4640. This numerical determination, however, is limited to heating systems sized for a maximum total heating capacity of 30 kW, is applicable only for heating applications using two geothermal energy probes and generally does not produce reliable design criteria.

Starting from the present state of the technology, it is therefore an object of the invention to provide a method with which radial geothermal energy probe fields can be easily designed with sufficient accuracy.

It would therefore be desirable and advantageous to address this problem and to obviate other prior art shortcomings by providing a method with which radial geothermal energy probe fields can be more easily designed with sufficient accuracy.

SUMMARY OF THE INVENTION

According to one aspect of the present invention, a method for designing a radial geothermal energy probe field therefore includes the following steps:
Defining a total number of geothermal energy probes to be introduced;
Defining the directions of incidence of the individual geothermal energy probes;
Determining perforation points of the geothermal energy probes in a spherical projection;
Determining the included angles between nearby geothermal energy probes;
Determining a mean value of the included angles;
Determining a mean value of the geothermal energy probe lengths;
Determining a mean center spacing using the mean values for the included angles and the lengths of the geothermal energy probes;
Calculating the total heat removal capacity by using conventional computing methods for vertical geothermal energy probe fields, wherein the mean center spacing is used for the distance between probes; and
Comparing the calculated total heat removal capacity with a predetermined desired heat removal capacity.

The present invention resolves prior art problems by using numerically-based software available for the design of vertical geothermal energy probe fields also for the design of a radial geothermal energy probe field by converting—in a defined way—the parameters, which can be changed in the design of a radial geothermal energy probe fields, into the corresponding parameters used in the design of a vertical geothermal energy probe field, so that these converted parameters can then be used as input values for the conventional numerically-based dimensioning software.

The inventor has come to the realization that geothermal energy probes in a vertical geothermal energy probe field are over the entire length substantially parallel relative to one another and hence thermally interact over their corresponding length during operation. Conversely, in a radial geothermal energy probe field, the mutual interaction between nearby geothermal energy probes changes due to the changing distance: at the starting point (starting shaft), where the geothermal energy probes are in close proximity, they interact considerably with respect to their heat exchange capacity. With increased distance from the starting point, the distance between two nearby geothermal energy probes also increases, thereby commensurately reducing the mutual thermal interaction. It can thus be inferred that two nearby geothermal energy probes in a radial geothermal energy probe field interfere with each other approximately to the same degree as two nearby geothermal energy probes in a vertical geothermal energy probe field which are arranged with a relative spacing that corresponds to the length of a line which connects the center points of the two geothermal energy probes in the radial geothermal energy probe field (center spacing).

Within the context of the invention, "heat removal capacity" (and correspondingly also total heat removal capacity, desired heat removal capacity, etc.) are intended to refer to the heating capacity and/or cooling capacity of the geothermal energy probe field.

Existing numerically-based software can be used to compute the total heat removal capacity based on conventional computing methods, in particular, for example the software "Earth Energy Designer" from the company BLOCON, Sweden, or the software "EWS" from the company Huber Energietechnik AG, Switzerland. The computing methods on which the software is based are conventional and have been thoroughly discussed in the final report from the Swiss Federal Department of Energy for "Enhancement of the Program EWS for Thermal Energy Probe Fields" of December 1999 (authors: Arthur Huber and Daniel Pahud). The entire contents of this report are incorporated in the present application documents by reference.

According to the method of the invention, the included angle between all geometrically possible pairings of geothermal energy probes of the radial thermal energy probe field may be determined and a mean value of the included angles is formed. This method may be quite complex depending on the total number of the introduced geothermal energy probes, so that in a preferred embodiment of the method of the invention, only the smallest included angles between directly adjacent geothermal energy probes are determined and then used for determining the mean value of the included angles. This approach can not only significantly reduce the complexity required for determining all geometric included angles, but it has also been observed that the precision of the design can be improved in this way, because excessive weighting of extreme values during averaging can be avoided.

According to another advantageous embodiment of the method of the invention using the same approach, the mean of the included angles and/or the mean of the geothermal energy probe lengths are determined by determining both the arithmetic mean and the median, wherein the smaller of the two values is then (always) used in the subsequent method steps of the method of the invention.

The median is determined as follows: the median (m) divides a distribution into two halves, i.e., it is defined as the center value of all values of the variables sorted according to their size. It therefore divides the distribution into two parts which ideally have the same number of values, so that at most half the values in the sample have a value <m, with the other half having values >m. For an even number of values, the median has two numerical values which can be different, in which case the smaller of the two numerical values may be used according to the invention.

A comparison between the computed total heat removal capacity and a predetermined desired heat removal capacity, or the difference determined between these two values, can be used to adapt the lengths of all geothermal energy probes or of individual geothermal energy probes and/or other parameters (in particular the total number of geothermal energy probes), in order to further adapt the computed total heat removal capacity more closely to the desired heat removal capacity. After the parameters have been adapted in this way, the method steps according to the invention can be performed again to check if the computed total heat removal capacity has become sufficiently close to the desired heat removal capacity.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
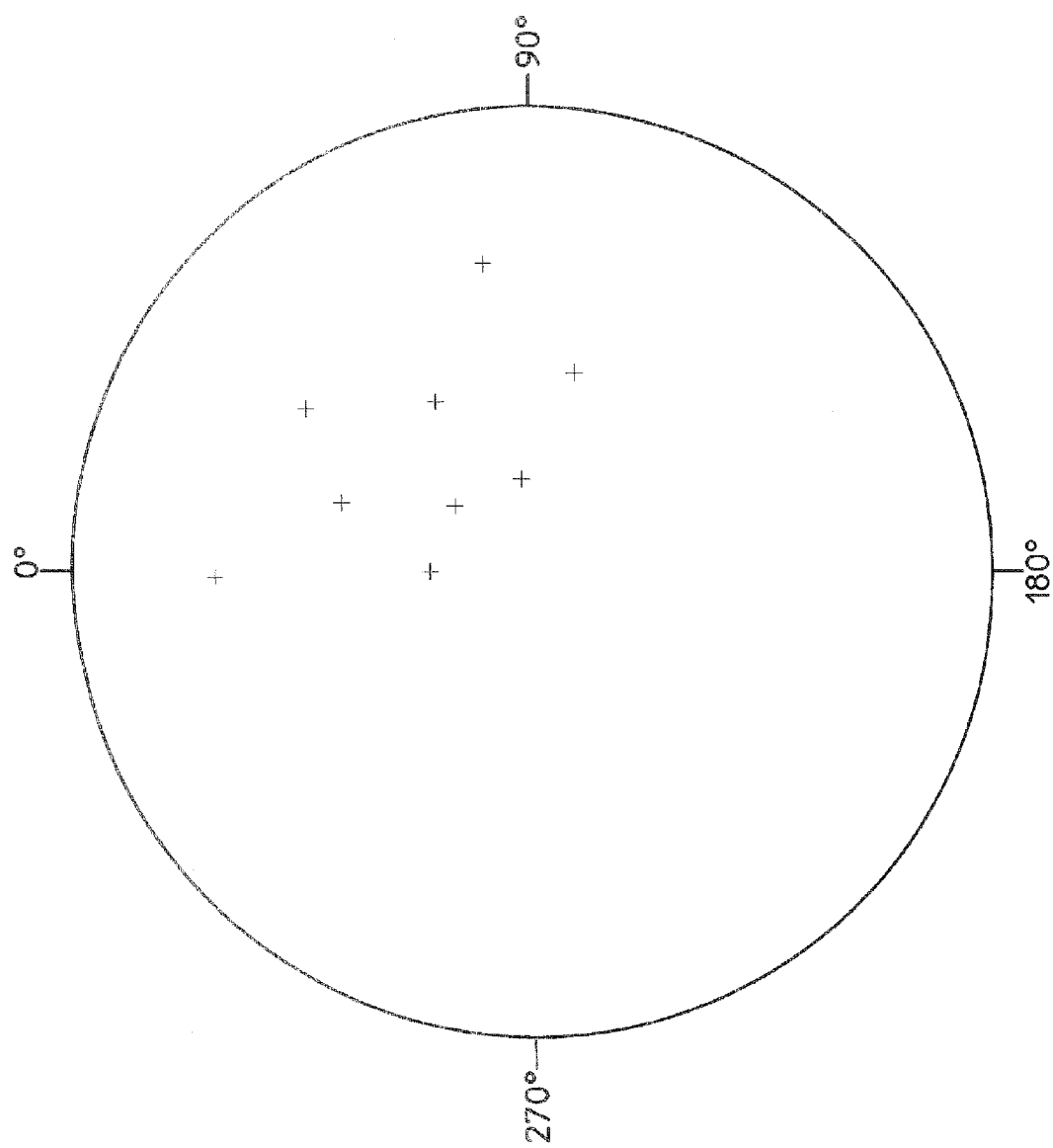
FIG. 1 a stereogram of an exemplary radial geothermal energy probe field generated with software.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

in the following discussion of the invention, an exemplary radial geothermal energy probe field consisting of nine geothermal energy probes each having a length of 40 m is planned. The nine geothermal energy probes should have the following directions of incidence: Probe 1: 000/30; Probe 2: 040/30; Probe 3: 080/30; Probe 4: 020/50; Probe 5: 060/50; Probe 6: 100/50; Probe 7: 000/70; Probe 8: 040/70; Probe 9: 080/70.

The first numerical value indicates the directional angle (i.e., the "compass direction" relative to a defined reference direction), whereas the second numerical value indicates the inclination angle (relative to the horizontal).

Turning now to the drawing, and in particular to FIG. 1, there is shown a stereogram of the geothermal energy probe field generated with a stereographic projection using a corresponding computer program ("Stereo32" from the Ruhr-University Bochum, Germany), wherein the symbol "+" represents the penetration point of the directions of incidence on the lower hemisphere of the Schmidt net diagram. The included angles between the individual probes can also be determined with this software.

Figure 2:
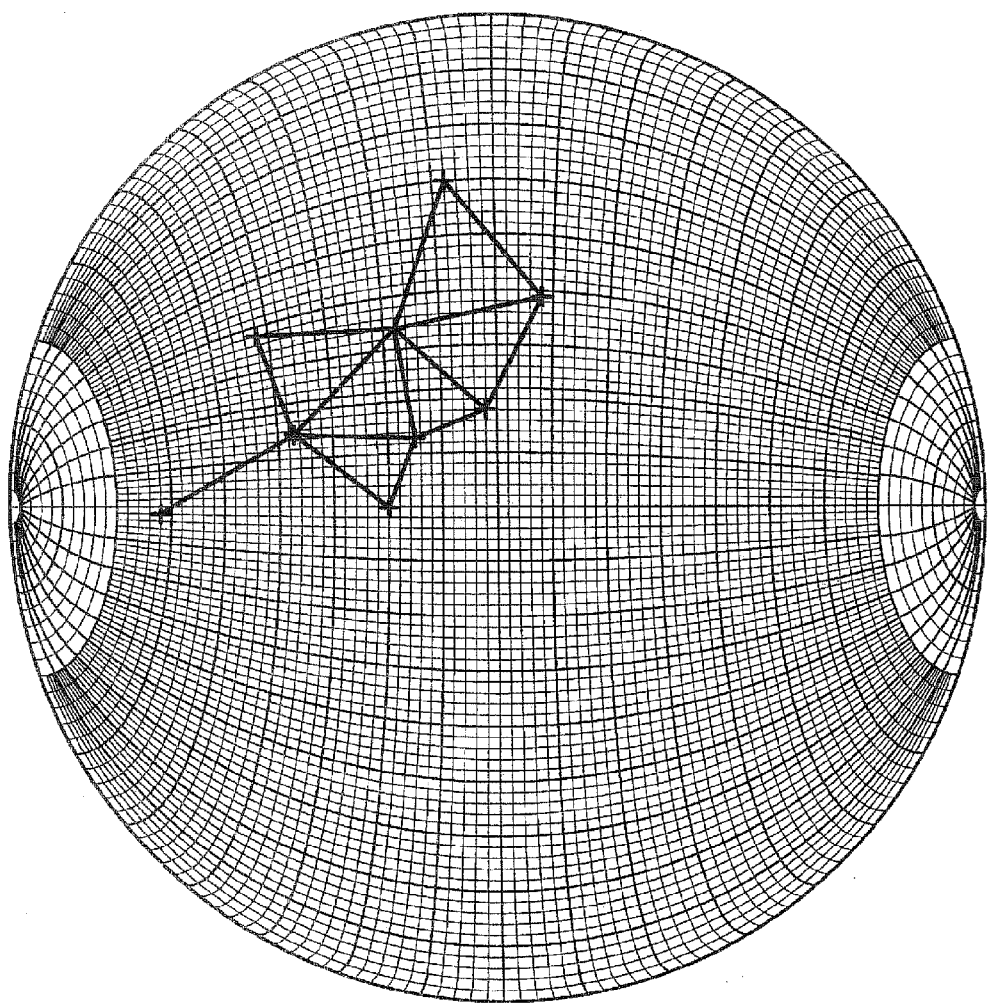
FIG. 2 a corresponding manually generated stereogram of the geothermal energy probe field.

FIG. 2 shows the corresponding manually generated stereogram. The corresponding penetration points of the directions of incidence are here represented by the symbol (*). The numerical values define the included angle. The included angle can be determined manually by arranging the penetration points of two directions of incidence on a great circle by rotating a superimposed transparent sheet of paper and by counting the angle between the penetration points on the small circles (located in between).

The method of the invention may then be performed, for example, by determining the included angle of all geometrically possible pairings of geothermal energy probes of the geothermal energy probe field and then determining therefrom an average included angle. However, this approach would be quite time-consuming, because a determination of the average included angle with the nine geothermal energy probes would require the measurement of $$A = \frac{N!}{(N-k)!} = \frac{9!}{(9-2)!} = \frac{362880}{5040} = 72$$

combinations. In addition, the extreme values would have a tendency to be heavily weighted due to the multiple summation and subsequent averaging of the 72 values, so that the standard deviation of the determined included angles would assume a large value. The following values (rounded) would be obtained for the exemplary geothermal energy probe field: arithmetic mean of the included angles: 37°; median of the included angles: 34°; and standard deviation: 14°.

Nearby probes in a geothermal energy probe field significantly interfere with each other with respect to heat exchange only if they are directly adjacent, i.e., if no third probe is located between the two nearby probes with a smaller included angle than the included angle between these two nearby probes. For example, if three geothermal energy probes are arranged nearby, then the outer geothermal energy probes essentially affect only the center geothermal energy probe, whereas the two outer geothermal energy probes directly influence each other only to a small degree. Accordingly, the approach to include all geometrically possible pairings in forming the statistical arithmetic mean or median only represents a coarse approach of the thermodynamics of interacting geothermal energy probes. This can cause the design of a geothermal energy probe field to be imprecise, in particular when designing more complex arrangements having more than four geothermal energy probes. The geothermal energy probe field will then typically be slightly undersized, because the selected center spacings between probes are too large.

In another advantageous embodiment of the method according to the invention discussed in the subsequent part of the description, only the smallest included angles between nearby geothermal energy probes are measured and used for statistical analysis. This can be done with a stereogram by determining exclusively the shortest angular distances between directly adjacent geothermal energy probes. A total of 13 combinations with the following included angles is obtained for the exemplary geothermal energy probe field: 14°, 14°, 22°, 22°, 22°, 22°, 25°, 25°, 25°, 26°, 26°, 26°, 26°. This results in the following mean values for the included angles: an arithmetic mean of 23°, a median of the included angles of 25° (determined as median of a sample, i.e., as mean of the sequence of included angles listed above), and a standard deviation of 4°. The further execution of the method of the invention is then based on the smaller value of the median or of the arithmetic mean, which in this case is the arithmetic mean of 23°.

In a following step, both the arithmetic mean and the median of the lengths are computed for all geothermal energy probes of the geothermal energy probe field. Because all probes in the exemplary geothermal energy probe field have the same length, the arithmetic mean and the median are each 40 m. If geothermal energy probes of different length are used in an alternative geothermal energy probe field, then the median and the arithmetic mean of the geothermal energy probe lengths may have different values, wherein preferably the smaller of the two values will be used for performing the additional method steps.

After the mean values for the included angles and the geothermal energy probe lengths have been computed, a mean center spacing can be determined for the geothermal energy probes by applying the cosine relation:

$$a = [2L^2 - (2L \cdot \cos(\alpha))]^{0.5} = [(2 \cdot 20 \text{ m})^2 - (2 \cdot 20 \text{ m})^2 \cdot \cos 23°]^{0.5} = [800 \text{ m}^2 - 736.4 \text{ m}^2]^{0.5} = 7.98 \text{ m}$$

wherein: $\alpha$: the determined mean value for the included angle, L: one half of the determined mean value of the geothermal energy probe lengths $$\left(L = \frac{40 \text{ m}}{2} = 20 \text{ m}\right)$$

and a: the mean center spacing between two probes.

The average center spacing for the geothermal energy probe field under consideration is therefore 7.98 m.

The determined mean value for the geothermal energy probe lengths (here: 40 m) and the determined average center spacing (here: 7.98 m) can then be inputted as input parameters into a suitable numerical-based simulation software, and the radial geothermal energy probe field can then be designed with the same software that was originally designed for vertical geothermal energy probe fields.

If the numerical simulation software requires the input of a g-function, then the configuration that best corresponds to the vertical cross-section of the geothermal energy probe field, in this example 3×3 probes arranged in a square configuration, should be selected.

A comparison between the value for the thermal power output of the geothermal energy probe field determined with the aforedescribed method and a corresponding value determined by finite-element analysis has shown that with the method of the invention the heat exchange capacity of a radial geothermal energy probe field is underestimated by about 15%, which can essentially be viewed as an advantageous safety factor in the design and the operation of a geothermal energy system.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for designing a radial geothermal energy probe field, comprising the steps of:
   using a computer to perform the following:
       defining a total number of geothermal energy probes in the radial geothermal energy probe field;
       defining a length and a direction of incidence of each geothermal energy probe;
       determining perforation points of the geothermal energy probes in a spherical projection;
       determining included angles between nearby geothermal energy probes;
       determining a mean value of the included angles;
       determining a mean value of the geothermal energy probe lengths;
       determining from the mean values for the included angles and the lengths of the geothermal energy probes a mean center spacing;
       calculating with a computing method for vertical geothermal energy probe fields a total heat removal capacity by using the determined mean center spacing as distance between probes; and
       comparing the calculated total heat removal capacity with a predetermined desired heat removal capacity.

2. The method of claim 1, further comprising the steps of:
   determining smallest included angles between directly adjacent geothermal energy probes, and
   determining a mean value of the determined smallest included angles.

3. The method of claim 1, further comprising the steps of:
   determining a value of an arithmetic mean and a value of a median of the included angles, and
   determining the mean value of the included angles from a smaller of the values determined for the arithmetic mean and the median.

4. The method of claim 1, further comprising the steps of:
   determining a value of an arithmetic mean and a value of a median of the geothermal energy probe lengths, and
   determining the mean value of the geothermal energy probe lengths from a smaller of the values determined for the arithmetic mean and the median.

5. The method of claim 1, further comprising the steps of:
   computing a difference between the calculated total heat removal capacity and the desired heat removal capacity, and
   adapting the length of a geothermal energy probe commensurate with the computed difference.

\* \* \* \* \*